June 23, 1964 L. DION 3,138,237
FEEDING DEVICE FOR AGRICULTURAL MACHINES
Filed May 9, 1963 2 Sheets-Sheet 1
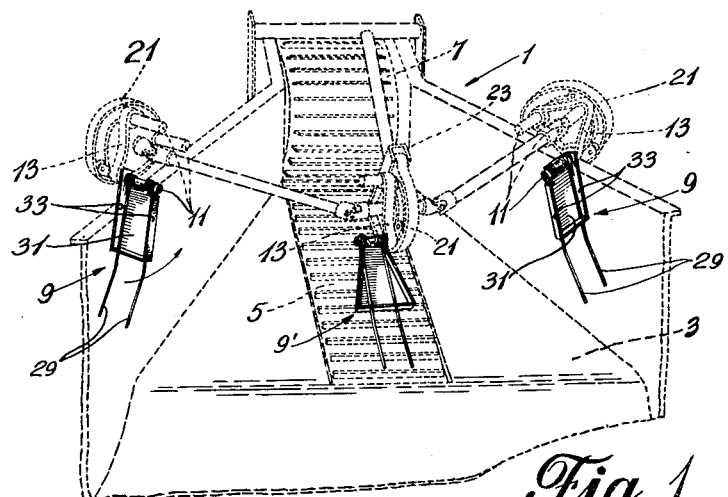
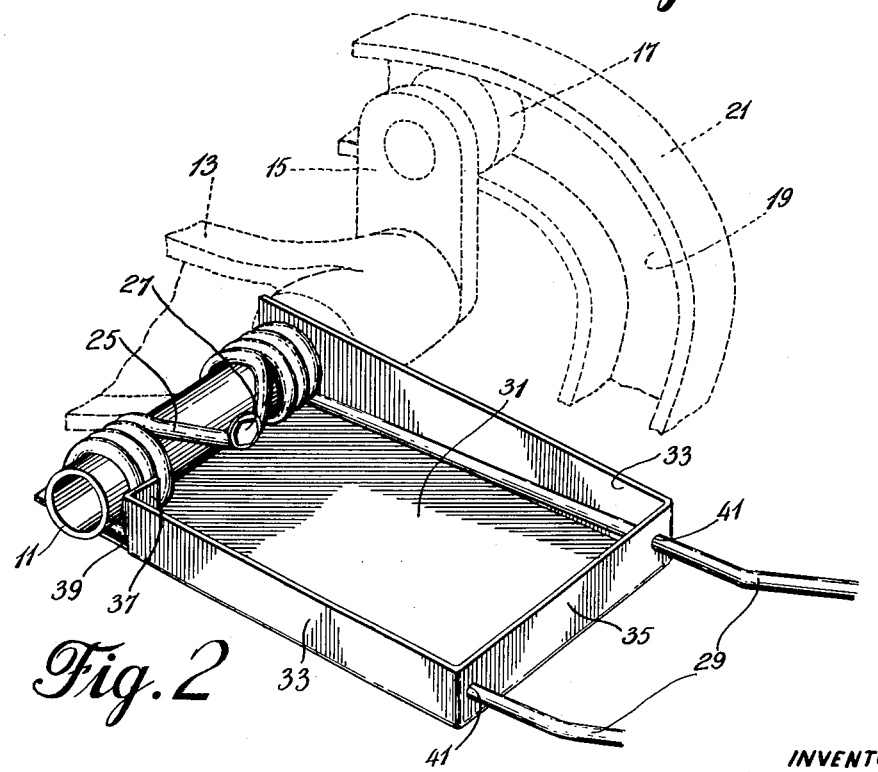
INVENTOR
Lucien DION
BY
ATTORNEYS.

INVENTOR
Lucien DION
BY
ATTORNEYS 3,138,237
FEEDING DEVICE FOR AGRICULTURAL
MACHINES
Lucien Dion, 26 Morris St., Ste-Therese de Blainville,
Quebec, Canada
Filed May 9, 1963, Ser. No. 279,280
5 Claims. (Cl. 198—103)

The present invention relates to a feeding device for an agricultural machine and more particularly to an attachment to go on said feeding device for directly feeding hay, straw or the like materials on a conveyor for subsequent discharging into a truck or other vehicle.

The invention is an improvement of my prior U.S. Patent No. 2,755,911 of July 24, 1956. In this patent, a feeding device is disclosed which is formed of a conveying chute converging towards one end thereof and into which hay or the like material is fed to be discharged into a truck. Centrally of the conveying chute, a conveyor is provided, leading the hay towards a further conveyor which lifts the material into a stand-by truck or other conveying vehicle. The feeding device is also provided with at least two rotatable pitchfork-like members adapted to push the material towards the converging end of the chute and on the conveyors.

In use, these pitchfork-like elements which are made up of a pair of prongs or tines projecting from a rotatable shaft are found inefficient because they do not offer a sufficient contact surface for such light material as hay or straw. The inefficiency of these sweeping elements is particularly noticeable in windy weather when the material has a tendency to be blown away out of the conveying chute.

It is therefore a main object of the invention to improve the pitchfork sweeping elements of the prior machine whereby to increase their efficiency, particularly in windy weather and thus prevent the material from being blown out of the said conveying chute.

Another object of the invention lies in the possibility of incorporating the improvement to existing machines and being able to do so at a very low cost.

The above mentioned objects may be obtained with a combination, according to the invention, to be used in a feeding device for an agricultural machine, the said device having a conveying chute converging towards one end thereof, wherein the combination comprises: a rotatable member mounted over the chute with the axis thereof extending substantially transversely of the chute; a rotatable shaft eccentrically mounted on the rotatable member within the chute; a pitchfork sweeping element secured to and depending from the rotatable shaft so as to sweep the material to be conveyed towards the converging end of the chute; the pitchfork element comprising: a spring coil wound around said shaft and fixed thereto at the center thereof; the spring coil having two free ends depending from the shaft to define two spaced parallel prongs, and a plate secured to and spanning the space between the prongs; the plate extending from the shaft and terminating short of the outer free ends of the prongs.

In accordance with a preferred embodiment of the invention, the plate is a box-like member having a bottom wall, two side walls and one end wall. The bottom wall lies against the coil spring and the prongs project through the end wall at a distance from the bottom wall.

The mounting of the plate on the spring coil and the supporting shaft is obtained by having one of the side walls thereof provided with an aperture to which the rotating shaft extends and having the other side wall bend inwardly over one of the prongs whereby the box-like member is fixed to both the shaft and the prongs.

A better idea of the invention will be had by the following description of a preferred embodiment of the invention which has reference to the appended drawings wherein:

FIG. 1 is a rear elevation view of a feeding device equipped with the pitchfork sweeping elements of the invention;

FIG. 2 is a perspective view, on an enlarged scale, of a pitchfork sweeping element of the invention as seen secured to the supporting shaft;

Figure 3:
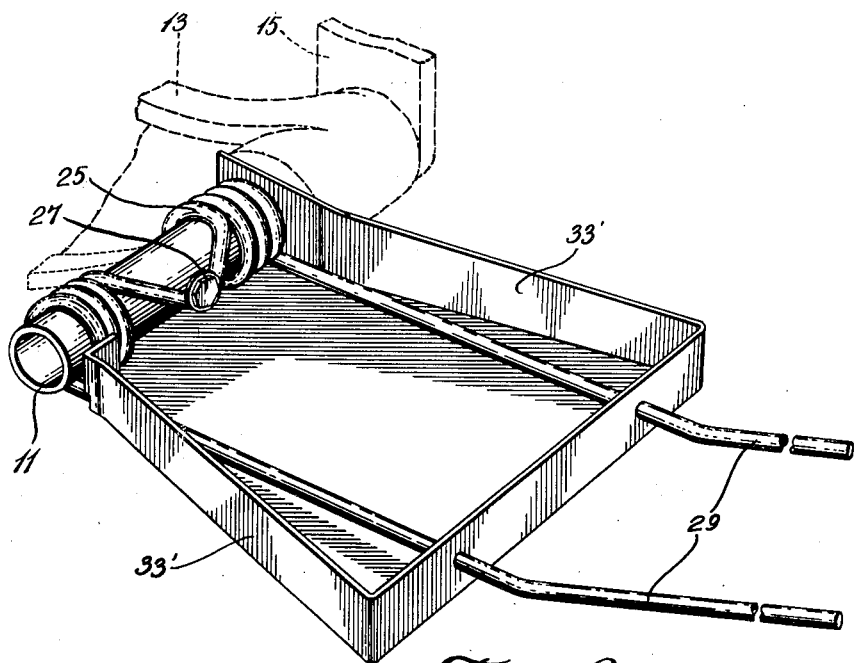
FIG. 3 is a perspective view of a further embodiment of a pitchfork sweeping element.

As shown in FIG. 1, the invention is for use with a feeding device, generally denoted by numeral 1, serving to feed hay, straw or the like material into a transport vehicle, not shown. The feeding device consists of a conveying chute 3, generally U-shaped in cross-section, converging towards one end thereof and provided, at the bottom with a first generally horizontal conveyor 5 leading into an upright conveyor 7 which is intended to discharge directly into the transport vehicle. Thus, after the material has reached a certain point of the feeding device, it is picked up by the conveyors and directed into the said vehicle.

The sweeping equipment intended to drive or push the material towards the converging end of the chute 3 and on the conveyors 5 and 7 derives its action from a plurality of rotating pitchfork sweeping elements 9, 9' each of which are secured on a shaft 11 eccentrically mounted on a rotatable member 13 the axis of which extends substantially transversely of chute 3. As best illustrated in FIG. 2 and as described in the aforesaid patent, shaft 11 is driven into rotation by a lever 15 rigidly connected at one end to the said shaft 11 and having, at the other end thereof, a roller 17 received in a cam track 19 provided at the periphery of a disk 21 secured at the upper end of each side wall of chute 3 as well as to a special supporting structure 23 centrally of the chute. A common shaft arrangement drives all three rotatable members 13 shown in FIG. 1.

By the special arrangement of the driving mechanism of the sweeping elements 9, the latter are made to radially extend from the rotatable member 13 when in the lower position, that is, when within the conveying chute 3. When shaft 11 reaches past the upper edge of the corresponding side of chute 3, the sweeping elements 9 then travel somewhat tangentially of the rotatable member 13 whereby any hay or the like material caught by the said sweeping elements will slide therealong rather than being pitched back as would be the case if sweeping elements 9 were kept constantly radial in relation to the rotating axis of rotatable member 13. The same feature applies to sweeping element 9'.

The sweeping element proper is a coil spring 25 wound around shaft 11 and secured, centrally thereof, to the said shaft 11 as by means of a retaining pin 27. It will be understood that this central portion of the coil 25 may also be welded to shaft 11.

The two spaced ends 29 of the spring coil, which ends actually form the prongs or tines, project from shaft 11, tangentially, and are preferably bent slightly rearwardly in relation to the direction of rotation thereof.

The invention provides for a plate-like member adapted to span the space between prongs 29, forwardly thereof in relation to the direction of rotation of the sweeping element and secured to both the spring coil and shaft 11.

This plate is, preferably, box-like in configuration having a bottom wall 31, two side walls 33 and a single end wall 35, the other end of the box-like structure being open. As clearly illustrated in FIG. 4, prongs 29 extend through suitable apertures 41 in end wall 35, preferably at the mid portion thereof, that is midway between bottom wall 31 and the upper edge of end wall 35. As to the parallel prongs, they should stand close to the lateral walls 33 of the box-like plate.

The box-like plate is fixed to shaft 11 by having a suitable aperture in one of the walls 33 adapted to allow passage of shaft 11 whereas the other wall 33 is bent inwardly as at 37 and notched as at 39 to allow passage of prong 29 which thus lies between bottom wall 39 and the lower edge of the said bend 37.

Figure 4:
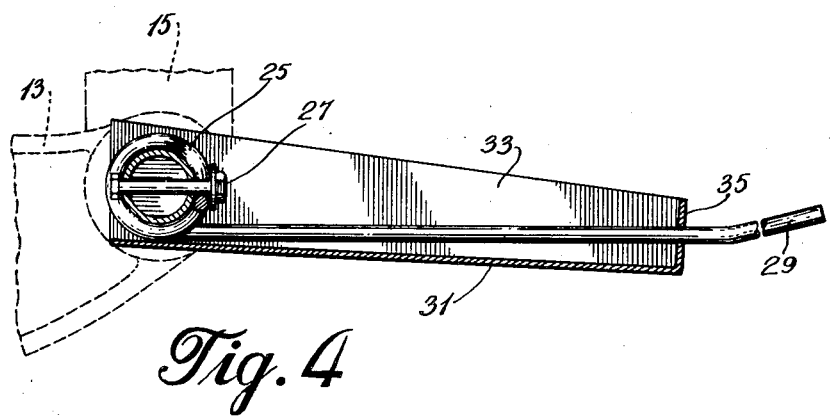
FIG. 4 illustrates a longitudinal cross-section of the pitchfork elements of either FIGS. 2 or 3.

As will be understood from perusal of FIGS. 2 and 4, the spring coil 25 is first assembled with the box-like plate by having the prongs 29 thereof inserted through holes 41 of end wall 35 until the coil portion abuts the bend 37. Thereafter, the whole assembly is slid over shaft 11 and coil 25 secured at the center thereof as by means of the retaining pin assembly 27.

The box-like plate of the sweeping element 9 of FIG. 2 has two parallel side walls 33 for particular use near the lateral sides of chute 3 as shown in FIG. 1 whereas the embodiment of FIG. 3 illustrates a box-like plate having side walls 33' outwardly diverging in relation to the supporting shaft 11 and for particular use centrally of chute 3. The particular sweeping element of FIG. 3 offers a greater surface contact with the material to be swept and is thus more advantageous.

Although a specific embodiment of the invention has just been described, it will be understood that various modifications may be made thereto without departing from the spirit of the invention, the scope of which should only be construed from the appended claims.

I claim:

1. In a feeding device for an agricultural machine, said device having a conveying chute converging towards one end thereof, the combination comprising:

(a) a rotatable member mounted over said chute with the axis thereof extending substantially transversely of said chute;

(b) a rotatable shaft eccentrically mounted on said rotatable member within said chute;

(c) a pitchfork sweeping element secured to and depending from said rotatable shaft so as to sweep the material to be conveyed toward the converging end of said chute; said pitchfork element comprising:

a spring coil wound around said shaft and fixed thereto at the center thereof;

said spring coil having two free ends depending from said shaft to define two spaced parallel prongs, and a plate secured to and spanning the space between said prongs; said plate extending from said shaft and terminating short of the outer free ends of said prongs.

2. A combination as claimed in claim 1 wherein said plate is a box-like member having a bottom wall, two side walls and one end wall; said bottom wall lying against said coil spring and said prongs projecting through said end wall at a distance from said bottom wall.

3. A combination as claimed in claim 2 wherein said side walls are parallel and lie close to said prongs.

4. A combination as claimed in claim 2 wherein one of said side walls is provided with an aperture through which said rotating shaft extends and the other side wall bends inwardly over one of said prongs whereby said box-like member is fixed to both said shaft and said prongs.

5. A combination as claimed in claim 2 wherein said side walls diverge from said coil spring toward said end wall.

References Cited in the file of this patent

UNITED STATES PATENTS 2,755,911     Dion _____ July 24, 1956